(12) United States Patent
Kaltenbach

(10) Patent No.: US 7,707,562 B1
(45) Date of Patent: Apr. 27, 2010

(54) CODE TRANSLATION VERIFICATION

(76) Inventor: Markus Kaltenbach, 6242 Plymouth Ave., San Jose, CA (US) 95129

(*) Notice: Subject to any disclaimer, the term of this patent is extended or adjusted under 35 U.S.C. 154(b) by 731 days.

(21) Appl. No.: 11/097,421

(22) Filed: Mar. 31, 2005

(51) Int. Cl.
*G06F 9/45* (2006.01)

(52) U.S. Cl. .................. 717/136; 717/139; 717/140; 717/141; 717/148

(58) Field of Classification Search ............. 717/136, 717/139–146, 148, 152–156, 108, 130, 131, 717/159, 140, 141
See application file for complete search history.

(56) References Cited

U.S. PATENT DOCUMENTS

| 5,202,975 | A | * | 4/1993 | Rasbold et al. | 717/151 |
|---|---|---|---|---|---|
| 5,675,801 | A | * | 10/1997 | Lindsey | 717/108 |
| 5,729,676 | A | * | 3/1998 | Inoue | 717/131 |
| 5,812,853 | A | * | 9/1998 | Carroll et al. | 717/143 |
| 5,875,331 | A | * | 2/1999 | Lindsey | 717/108 |
| 5,958,061 | A | | 9/1999 | Kelly et al. | |
| 5,966,536 | A | * | 10/1999 | Ravichandran | 717/153 |
| 6,029,002 | A | * | 2/2000 | Afifi et al. | 717/146 |
| 6,031,992 | A | | 2/2000 | Cmelik et al. | |
| 6,199,152 | B1 | | 3/2001 | Kelly et al. | |
| 6,292,937 | B1 | * | 9/2001 | Sakata et al. | 717/154 |
| 6,594,821 | B1 | | 7/2003 | Banning et al. | |
| 6,594,824 | B1 | * | 7/2003 | Volkonsky et al. | 717/159 |
| 6,877,155 | B1 | * | 4/2005 | Lindsey | 717/108 |
| 7,073,166 | B2 | * | 7/2006 | Bera | 717/130 |
| 2006/0114132 | A1 | * | 6/2006 | Zhang et al. | 717/136 |

OTHER PUBLICATIONS

Rival, X. "Symbolic Transfer Function-based Approaches to Certified Compilation", 2004, ACM, p. 1-13.*
Viega, et al. "Token-Based Scanning of Source Code for Security Problems", 2006, ACM, p. 238-261.*
Fong, et al. "Proof Linking: Modular Verfication of Mobile Programs in the Presence of Lazy, Dynamic Linking", 2001, ACM, p. 379-409.*
Das, et al. "ESP: Path-Sensitive Program Verification in Polynomial Time", 2002, ACM, p. 57-68.*

* cited by examiner

*Primary Examiner*—Wei Y Zhen
*Assistant Examiner*—Qamrun Nahar

(57) ABSTRACT

The present invention translation verification system and method verifies code fragment translations and/or optimizations that are bounded by externally observable information.

26 Claims, 9 Drawing Sheets

200

PERFORMING A DECOMPOSITION PROCESS WHICH BOUNDS CODE FRAGMENTS BY OBSERVATION POINTS
210

PERFORMING A VALIDATION PROCESS ON THE CODE FRAGMENTS
220

300

```
┌─────────────────────────────────────────┐
│   PERFORMING A FRAGMENT DETERMINATION   │
│   PROCESS ON SOURCE CODE AND TARGET CODE│
│                   310                   │
└─────────────────────────────────────────┘
                     │
┌─────────────────────────────────────────┐
│   ESTABLISHING A CORRESPONDENCE BETWEEN │
│ RESULTING FRAGMENTS OF THE SOURCE CODE AND│
│              THE TARGET CODE            │
│                   320                   │
└─────────────────────────────────────────┘
```

```
┌─────────────────────────────────────────┐
│   MATCHING CODE FRAGMENTS WITH          │
│ CORRESPONDING OBSERVATION POINTS BY     │
│ TRAVERSING THE ORDERED FRAGMENT SEQUENCE│
│                  610                    │
└─────────────────────────────────────────┘
                    │
                    ▼
┌─────────────────────────────────────────┐
│    CLEANING UP FRAGMENT CORRESPONDENCE  │
│  UTILIZING NULL SET CORRESPONDENCE BLOCKS│
│                  620                    │
└─────────────────────────────────────────┘
                    │
                    ▼
┌─────────────────────────────────────────┐
│   ORDERING THE PAIRS IN A WAY CONSISTENT│
│           WITH PARTIAL ORDERS           │
│                  630                    │
└─────────────────────────────────────────┘
```

FIGURE 6

CODE TRANSLATION VERIFICATION

FIELD OF THE INVENTION

The present invention relates to the field of code translation and verification.

BACKGROUND OF THE INVENTION

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These electronic devices often include processors that perform instructions included in software code. In some processing architectures software code is translated and/or optimized. However, translation and/or optimization procedures is typically a formidable task that is susceptible to errors and a high likelihood of producing incorrect translated and/or optimized versions of the instructions.

SUMMARY

The present invention translation verification system and method verifies code fragment translations and/or optimizations for code fragments that are bounded by externally observable information.

BRIEF DESCRIPTION OF THE DRAWINGS

FIG. 3 is a flow chart of an exemplary decomposition process in accordance with one embodiment of the present invention.

FIG. 6 is a flow chart of an exemplary correspondence process in accordance with one embodiment of the present invention.

DETAILED DESCRIPTION

Figure 1:
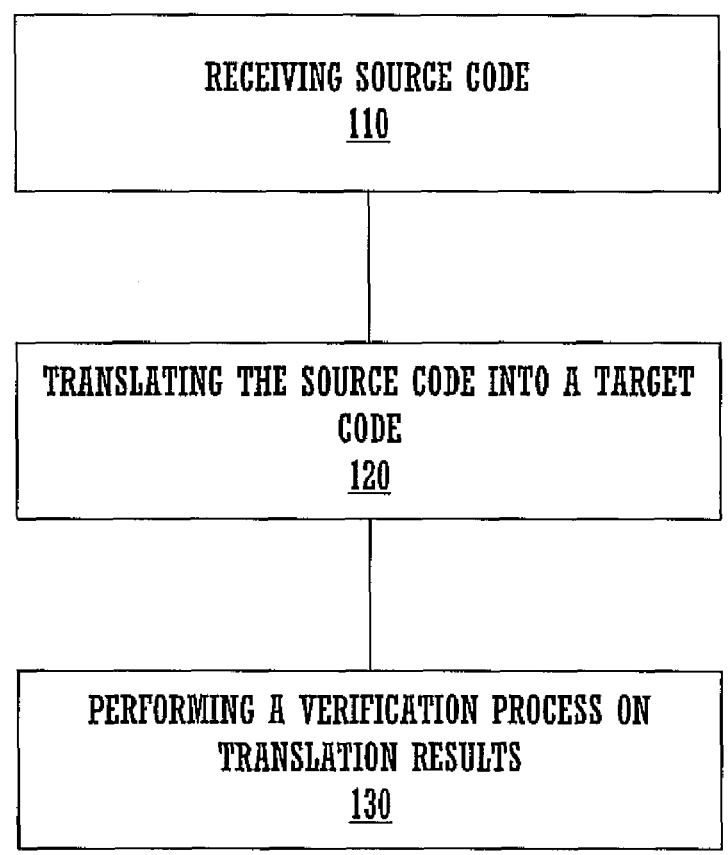
FIG. 1 is a block diagram of an exemplary code translation method in accordance with one embodiment of the present invention.

Reference will now be made in detail to preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present verification systems and methods facilitate efficient tractable equivalence checking between source code and associated translated target code of various programs with arbitrarily shaped control flow graphs. In one embodiment, the various programs have externally observable points and a fixed bound on execution time between observation points. The equivalence checks are performed on loop-free code pieces with certain derived context assumptions. In one exemplary implementation, observation points can be points at which relevant internal program states become externally visible. Relevant internal program states are allowed to diverge arbitrarily between sequence points but are matched again once the next pair of corresponding sequence points is reached (e.g., after a bounded number of program steps). This permits rollback to the previous common commit point in cases in which a divergence due to wrong speculation is detected that cannot be reconciled by forward progress. A time bound on code execution between observation points can also allow for responsive handling of interrupts or multiple threads. Translation verification systems and methods of the present invention enjoy a tighter notion of equivalence than just ordinary input/output equivalence on certain programs.

FIG. 1 is a block diagram of code translation method 100 in accordance with one embodiment of the present invention. In one embodiment of the present invention, code translation method 100 verifies that target code translated from source code produces the same output. In one exemplary implementation, the target code is also optimized.

In step 110, source code is received. The source code can have a variety of implementations. For example, the source code can be code associated with an application and can be written in a high level language. In one embodiment of the present invention the source code is an intermediate translation. For example, the source code can be an intermediate code produced as part of a system in which a processor and morphing code are utilized to execute information configured in another architecture.

In step 120, the source code is translated into a target code. In one embodiment the target code is assembly language and/or machine code. In one exemplary implementation the target code is also optimized as it is translated. In one embodiment of the present invention, the translation is part of code morphing operations in which intermediate code is the source code and machine code is the target code. In one exemplary implementation, the source code is translated into optimized very long instruction words (VLIWs) in which native translations can reduce the number of instructions executed. Additional descriptions of processor architectures for translating code can be found in commonly assigned United States Patents:

HOST PROCESSOR WITH APPARATUS FOR TEMPORARILY HOLDING TARGET PROCESSOR STATES (U.S. Pat. No. 5,958,061)

COMBINING HARDWARE AND SOFTWARE TO PROVIDE AN IMPROVED MICROPROCESSOR (U.S. Pat. No. 6,031,992)

TRANSLATED MEMORY PROTECTION APPARATUS FOR AN ADVANCED MICROPROCESSOR (U.S. Pat. No. 6,199,152)

TRANSLATED CONSISTENCY CHECKING FOR MODIFIED TARGET INSTRUCTIONS Y COMPARING TO ORIGINAL COPY (U.S. Pat. No. 6,594,821)

which are incorporated herein by reference.

In step 130, a tractable decomposition verification process is performed on the results of the translating. In one embodiment of the present invention the decomposition verification process breaks the source code and target code down into respective fragment components that are bounded by externally observable points. A correspondence between the source code fragments and respective target code fragments is established and validation process is performed to determine if corresponding source and target code fragments are properly translated and optimized.

In one embodiment, translation and verification systems and methods create a correspondence between respective observation points of the source code and target code. For example, a full correspondence match can be created in which every observation point in the first code piece (e.g., a source code piece) is matched with (at least) one observation point in the second code piece (e.g., target code piece) and vice versa. There can also be a partial correspondence match in which all entry, exit and loop observation points in the first code piece (e.g., source code) are matched with corresponding observation points in the second code piece (e.g., target code).

Figure 2:
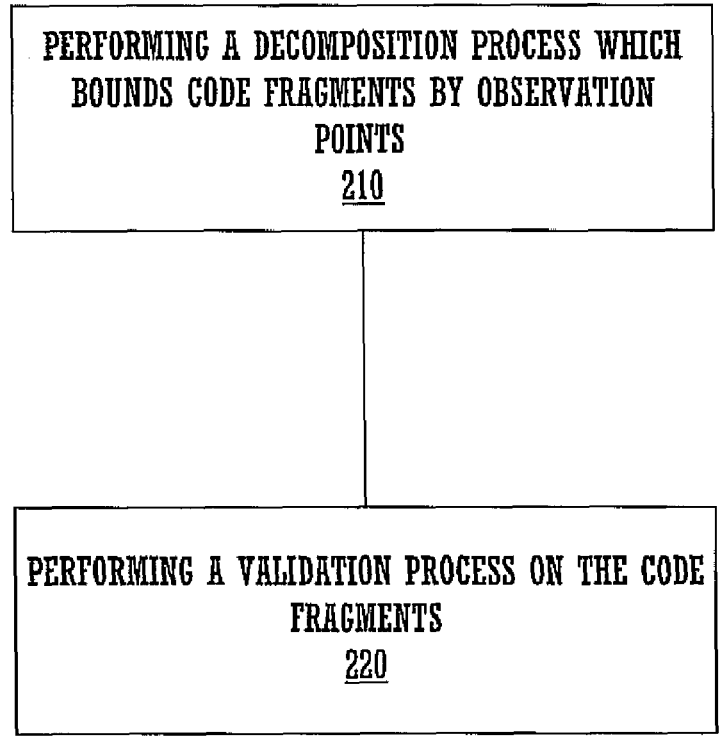
FIG. 2 is a flow chart of an exemplary code verification method in accordance with one embodiment of the present invention.

FIG. 2 is a flow chart of exemplary code verification method 200 in accordance with one embodiment of the present invention. In one embodiment, code verification method 200 verifies that target code produces the same output the source code it is translated and/or optimized from.

In step 210, a decomposition process is performed wherein a resulting plurality of code fragments are bounded by external observable points. In one embodiment, correspondences between the resulting code fragments of a source code and resulting code fragments of a target code are identified. It is appreciated that the code fragments can also be bounded by a variety of additional constraints and/or parameters. For example, the resulting code fragments are also bounded by a time restriction. In one embodiment the code pieces are decomposed into sets of pairs of loop free code fragments and preconditions. In one embodiment, the code fragments are paired up at entry and exit points while underlying branching behavior of the graph is taken into consideration.

In step 220 a validation process is performed on the code fragments. Then validation process checks if a target code fragment produces the same results as the source code fragment. In one embodiment, results of executing one of the plurality of code fragments includes assumptions for use in another subsequent one of the plurality of code fragments.

FIG. 3 is a flow chart of an exemplary decomposition process 300 in accordance with one embodiment of the present invention. Decomposition process 300 breaks the source code and target code into fragments that facilitate tractable analysis of the similarities of source code and target code functionality.

In step 310, a fragment determination process is performed on a source code and a target code. In one embodiment of the present invention, the fragment determination process bounds source code and target code fragments in accordance with the ordered occurrence of observation points. The fragment determination process can also bound source code and target code fragments in accordance with time constraints.

In step 320, a correspondence is established between resulting fragments of the source code and the target code. In one embodiment of the present invention correspondence is established in a correspondence process.

Figure 4:
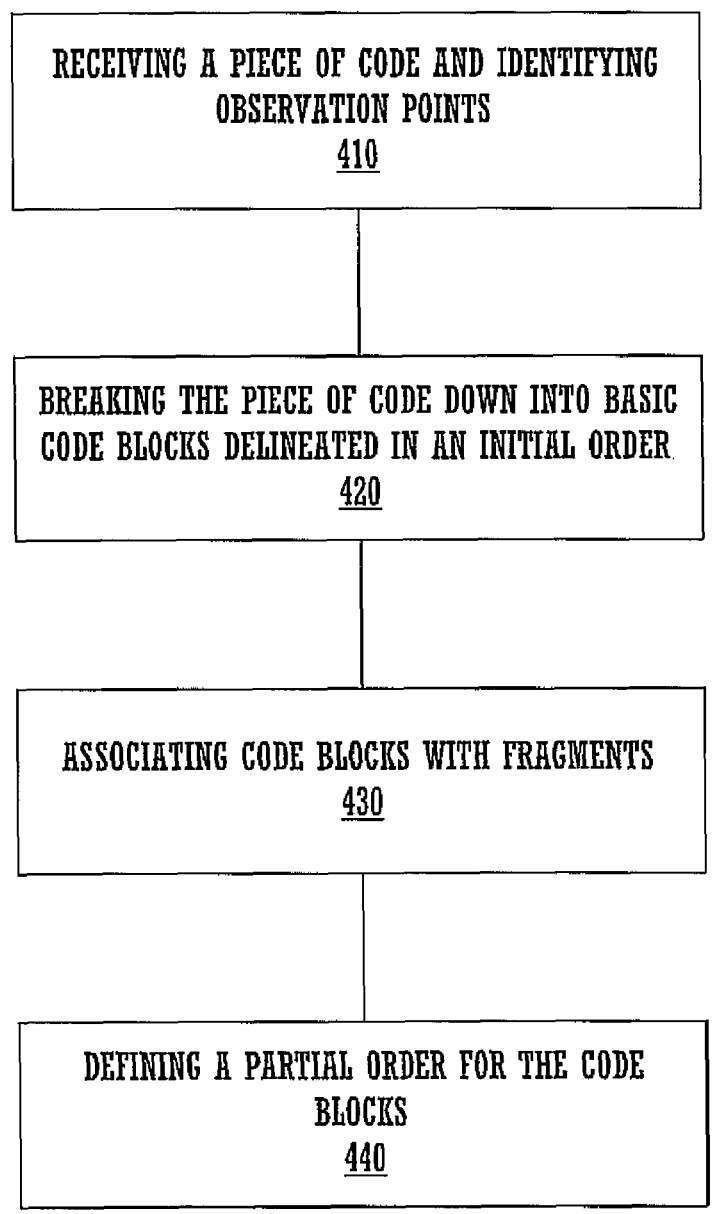
FIG. 4 is a flow chart of an exemplary fragment determination process in accordance with one embodiment of the present invention.

FIG. 4 is a flow chart of fragment determination process 400 in accordance with one embodiment of the present invention. In one embodiment of the present invention, fragment determination process 400 is utilized in step 310 to determine bounds on source code and target code fragments.

In step 410, a piece of code is received and observation points are identified. An observation point is a sequence point in the code execution at which properties or characteristics (e.g., values) of components (e.g., hardware, software, firmware, virtual, etc.) associated with relevant internal program states are externally obtainable or "visible".

In step 420, the received piece of code is broken down into basic code blocks delineated in an initial order. In one embodiment, the initial order includes entry and exit blocks that are identified as having respective observation points. In one exemplary implementation, a block (e.g., exit block) can be empty.

In one embodiment, the delineated initial order is represented by a code block flow graph in which nodes of said flow graph are basic code blocks. In one embodiment of the present invention, the input is a first code piece (e.g., a source code piece) and a second code piece (a target code piece) which can be represented in respective flow graphs. The nodes of the graph are basic code blocks. The edges of the graph are control flow transfers between basic blocks (either via an explicit branch or via an implicit "next instruction" transfer). Some of the basic blocks are marked as having observation points at their beginning. In one embodiment, any possible unbounded loop in the source code or target code has an observation point in its body. In one exemplary implementation, without loss of generality it is assumed that the observation point is at the beginning of the loop. If the observation point is not at the beginning of the loop the loop can be partially unrolled to move the observation point to the beginning.

In step 430, the code blocks are associated with fragments (e.g., delineate which basic code blocks are included in a fragment). In one embodiment, a fragment includes a first block with an externally observable point and a second block that does not include an observation point, and the second code block is reachable from the first code block without going through a third code block with an observation point. In one exemplary implementation, a fragment includes multiple sequentially ordered code blocks and one observation point. For example, a fragment includes a code block with an observation point and a subsequently ordered code block without an observation point.

In step 440, a partial order is defined for the fragments. In one embodiment, the partial order is in accordance with a sequential relationship between the plurality of code fragments. In one exemplary implementation, a fragment X precedes a fragment Y if and only if Y is reachable from X. In one embodiment, backward edges of loops are removed.

In one embodiment, a fragment graph is utilized to represent the partial order of fragments as nodes. In one exemplary implementation, the nodes are directed acyclic graphs and represent code fragments. A partial order is defined between the fragments by removing back edges of loops in a manner that produces a loop free graph. In one exemplary implementation, a fragment X precedes a fragment Y if and only if Y is reachable from X in the loop-free fragment graph.

Figure 5A:
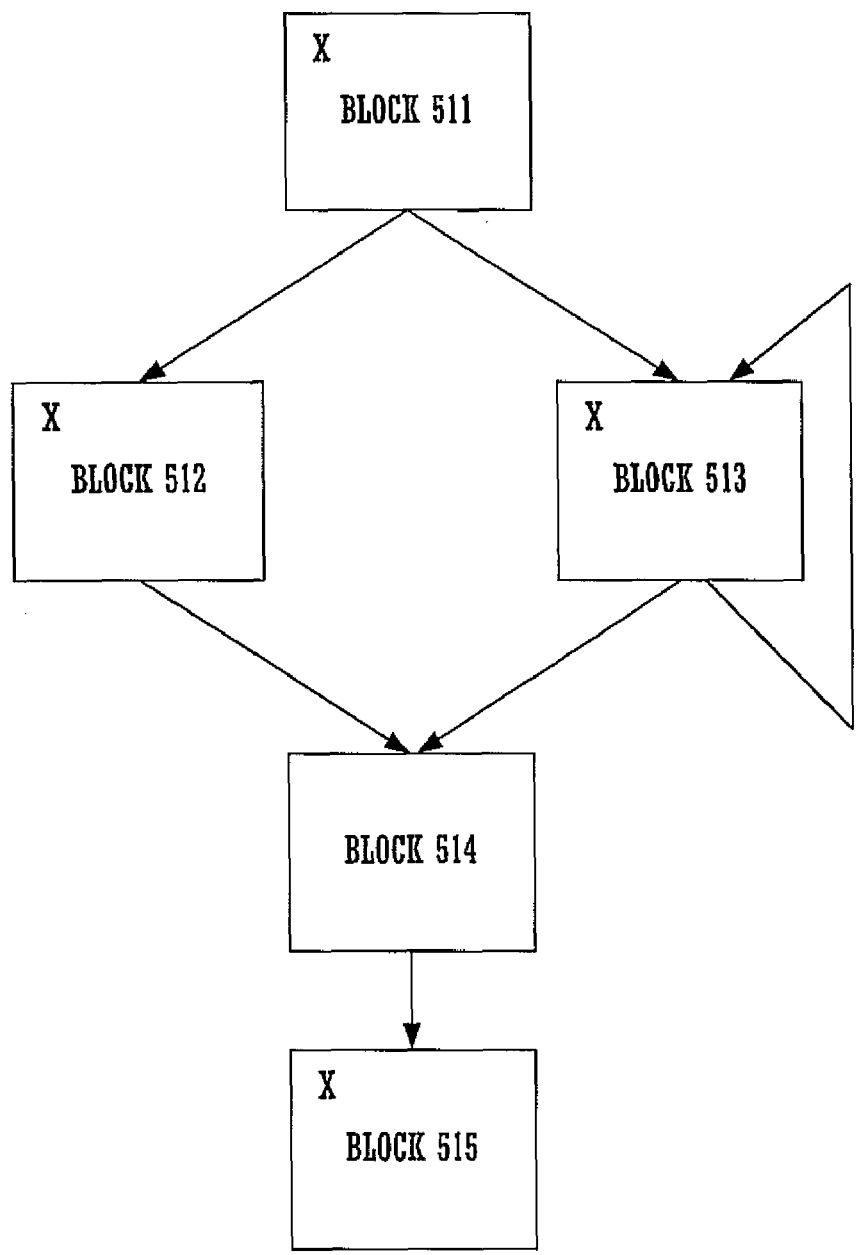
FIG. 5A is a flow chart of an exemplary source code fragment graph in accordance with one embodiment of the present invention.
Figure 5B:
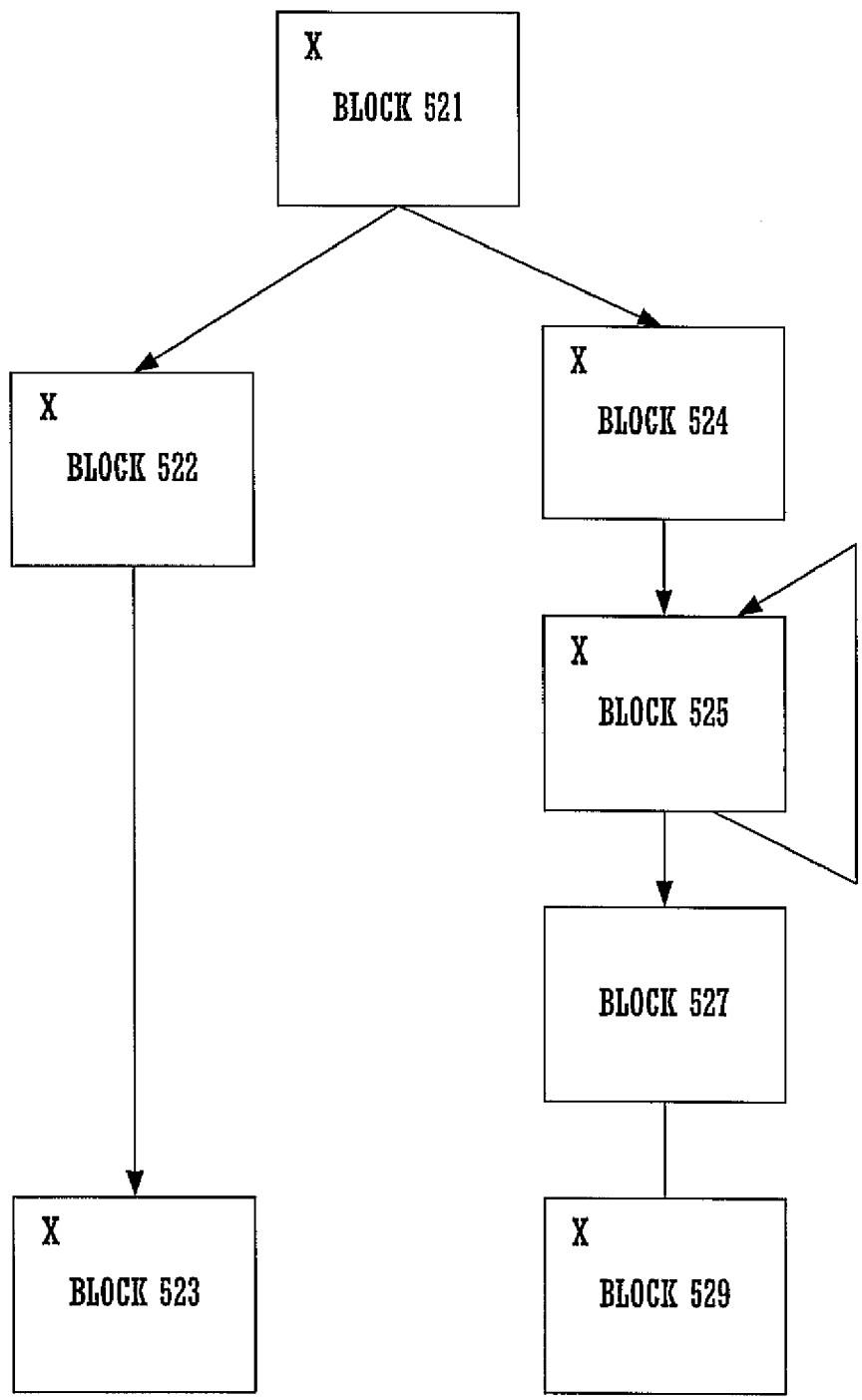
FIG. 5B is a flow chart of an exemplary target code fragment graph in accordance with one embodiment of the present invention.

FIG. 5A is a flow chart of exemplary source code fragment graph 510 in accordance with one embodiment of the present invention. Source code fragment graph 510 includes basic code blocks 511 through 515. FIG. 5B is a flow chart of exemplary target code fragment graph 520 in accordance with one embodiment of the present invention. Target code fragment graph 520 includes basic code blocks 521 through 529. Code blocks that include an observation point are designated with an "X". Each code block in target code fragment graph 520 is a code fragment except code block 527 is clustered in the same code fragment as code block 525.

FIG. 6 is a flow chart of correspondence process 600 in accordance with one embodiment of the present invention. In one embodiment, correspondence process 600 matches pairs of corresponding source code and target code fragments.

In step 610, the code fragments with corresponding observation points are matched (e.g., "paired up") by traversing the fragment ordered sequence. In one embodiment, a structural match starts at corresponding entry points of the code pieces and proceeds until all paths through the flow graphs are matched. In one exemplary implementation, a full correspondence of observation points is established. In one embodiment, an indication of the correspondence is included in information from a translator. Backtracking can also be utilized to establish complete correspondence (e.g., if a full correspondence is not established on a first pass through the fragment graphs). It is not required that there be a one-to-one correspondence of observation points, as the translation can introduce or eliminate such points. For example, in exemplary flow graph 510 and 520 shown in FIGS. 5A and 5B a portion of the code is "hoisted" out of loop block 513, and in which tail duplication is performed on block 514. For example, the following sequence points are matched: 511-521, 512-522, 513-524, 513-525, 515-523, and 515-529.

In step 620, fragment correspondence is cleaned up including utilizing null set correspondence blocks. In the case of introduction or elimination of sequence points by the translation is possible that an empty code fragment is paired with a non-empty one. In one exemplary implementation, the fragment correspondence is cleaned up by replacing any pair (fa, fb) with (fa,null) for which both fa and some successor fragment of fa are matched with the same fragment (fb) in target code fragment graph. Similarly, any pair (fa, fb) can be replaced with (null, fb) if both fb and some successor are matched with the same fragment (fa) in the source code fragment graph. Null denotes an empty fragment, indicating that any fragment matched with it cannot have any observable effect on an execution state. In addition, consistency can be established in the correspondence. For example, the following decomposition is obtained for the sequence points in FIGS. 5A and 5B:

[511:512]-[521:522], [511:513]-[521:524], [:513]-[524:525], [513:513]-[525:525], [512 514:515]-[522:523], and [513 514:515][525 527:529]

where the notation "[XY:Z]" represents the fragment comprising the block X followed by block Y up to (but not including) block Z.

In step 630, the pairs (e.g., (fa,fb)) are finally ordered in a way consistent with partial orders (e.g., on source code blocks and target code blocks). The ordered output sequence is the decomposition of the original source code and target code pieces that is suitable for the subsequent validation.

The preconditions associated with each fragment are the characterizations of the possible start states of the respective fragments. For example, the precondition for the entry match [511:512]-[521:522] is the precondition for the entire piece of code (which could be unconstrainted). The precondition for the match [512 514:515]-[522:523] is the characterization of the start state of blocks 512 and 522 (which typically is the post condition of executing blocks 511 and 521 with the branching condition that leads to blocks 512 and 522). The precondition for the loop match [513:513]-[525:525] is similarly the post condition of executing blocks 511 and 521, 524, with the respective opposite branch condition and a generalization applied to represent any detected inductive state components.

Figure 7:
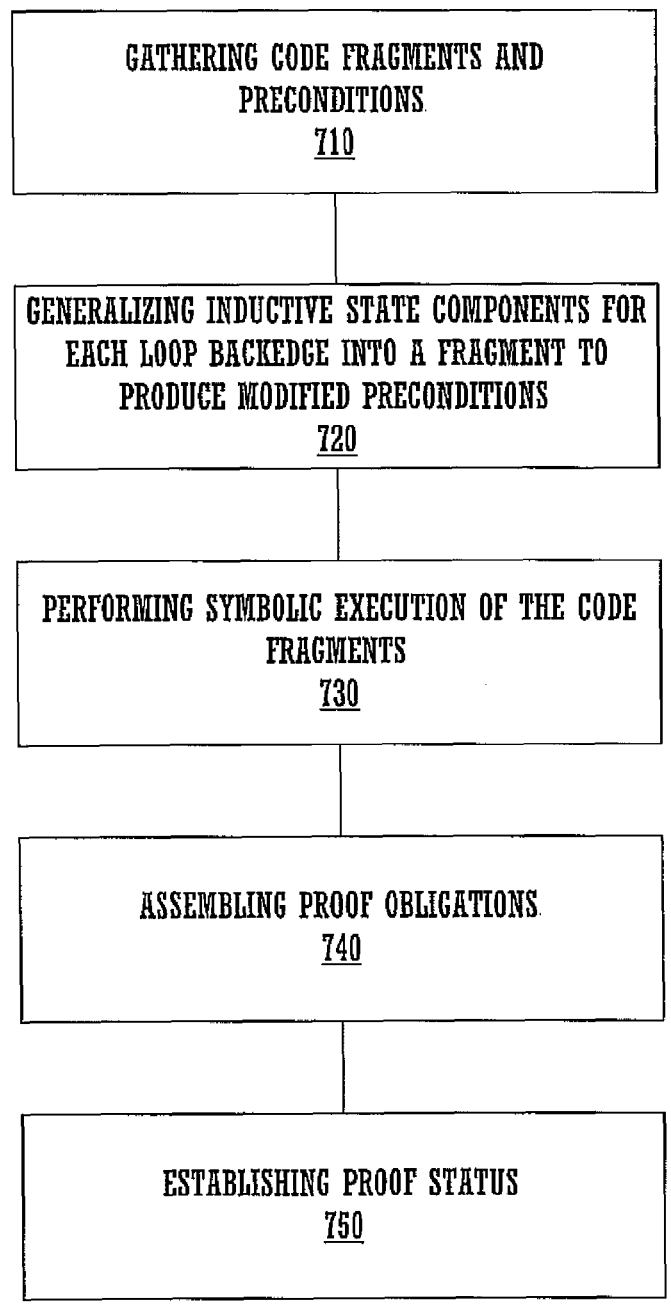
FIG. 7 is a flow chart of an exemplary code verification method in accordance with one embodiment of the present invention.

FIG. 7 is a flow chart of exemplary code verification method 700 in accordance with one embodiment of the present invention. In one embodiment of the present invention, code verification method 700 verifies source code and target code fragments produce the same results.

In step 710, code fragments and preconditions (e.g., assumptions) are gathered. In one embodiment, the preconditions of a fragment are gathered by building the disjunction of post conditions of a direct predecessor fragment. In one exemplary implementation, the precondition for an entry fragment is set to unconstrained (e.g., "TRUE" in a Boolean representation of conditions).

In step 720, inductive state components are generalized for each loop back edge into a fragment to produce modified preconditions. In one embodiment, a state component is inductive for a loop, if the state component is read before it is written on some path through the loop body. In the following code A:
   Loop:
      y := M[x]
      x := f.x
      while y != 0 x is inductive. Similarly, in the translated and/or optimized version of the code:

B:
 z:=M[x]
 Loop:
 y:=z
 x:=f.x
 z:=M[x]
 while y !=0 x and z are inductive. In one embodiment, the generalization of a state for a state component x is obtained by allowing more general value for x that correspond to the effect an arbitrary loop execution has on x. In the present example, the generalization would replace any concrete value for x by arbitrary values (in the form of a freshly introduced variable) provided no specific properties of the update function f is exploited in the translation from code A to code B.

In step 730, symbolic execution of the code fragments is performed. In one embodiment, symbolic execution uses symbolic representation of sets of possible values of state components (as opposed to concrete single values used in direct execution) to allow for the simultaneous handling of all possible data values. The symbolic execution of the code fragment produces a post condition characterizing the subsequent state of observable points.

In step 740, proof obligations (verification conditions for equivalence checks) are assembled from preconditions obtained in step 710 and symbolic execution results obtained in step 730. In one embodiment, the exact nature of the proof obligations depends on the required notion of equivalence between source and target code pieces. In one exemplary implementation, the proof obligation requires that relevant state components have equivalent values of the end of the code fragment executions, assuming that relevant state components were equivalent at the beginning of the code fragment executions and that the starting states meet some conditions that guarantee error free execution." A state component is relevant if it is required to have identical values in the source code and the target code at corresponding observable points.

In one embodiment, the proof obligation is extracted from observable points for relevant state components and coupling invariants identified for induction. The poof obligation for a relevant state component x requires that the value of x under the post condition of the source code fragment be the same as the value of x under post condition of the target code fragment, provided the precondition of the source code fragment and the precondition of the target code fragment are satisfied. In one embodiment, coupling invariants establish sufficiently tight connections between inductive state components of the two fragments under consideration. The coupling invariants can express relationships between such state components that are required and guaranteed to hold whenever observable points are hit. In the previous loop examples, the coupling invariants are:

x (in the source code)==x (in the target code) and

M[x] (in the source code)==z (in the target code).

For each such coupling invariant an inductive proof obligation is set up to confirm the invariant by showing that it holds initially and that under the precondition assumption it holds after some number of loop iterations and for one more loop iteration after that. In one exemplary implementation, the coupling invariant can be expressed in the following manner:

$$x==x'$$

$$M[x]==z'$$

where the undecorated variables refer to the source code and decorated (e.g., ') variables refer to the target code. The proof obligations for the coupling invariants associated with the previous example can be expressed in the following manner:

$$x==x'|=f.x==f.x'$$

$$M[x]==z'|=M[f.x]==M'[f.x']$$

In one embodiment of the present invention, handling invariants and inductive variables includes matching observation points that allow for an iteration by iteration analysis of a loop.

In step 750, a proof status is established. In one embodiment, a suitable prover is invoked for comparing a pair of the plurality of code fragments. In one embodiment the pair of the plurality of code fragments includes a corresponding source code fragment and a target code fragment. A proof status is established by discharging proof obligations. The proof obligation can be discharged by submitting them to a suitable equivalence checker or prover to obtain certificates of equivalence or debugging information for failures. Efficient checkers can be constructed using a variety of different techniques (such as normalized symbolic representation of memory operations, discovery and validation of loop invariants, data structures for symbolic execution and checking over bit vectors, handling external subroutines represented by interface characterizations).

In one embodiment of the present invention failure is reported for failed obligations on relevant state components. In one exemplary implementation, the process returns to step 720 and attempts a more restrictive generalization. Failure information from the prover can be utilized to direct restriction of the generalization. If a more restrictive generalization is not possible a failure is reported.

In one embodiment, the post conditions or assumptions are forwarded to successor fragments. In one embodiment, the post conditions are additionally constrained with applicable branch conditions for paths taken to successor fragments.

Figure 8:
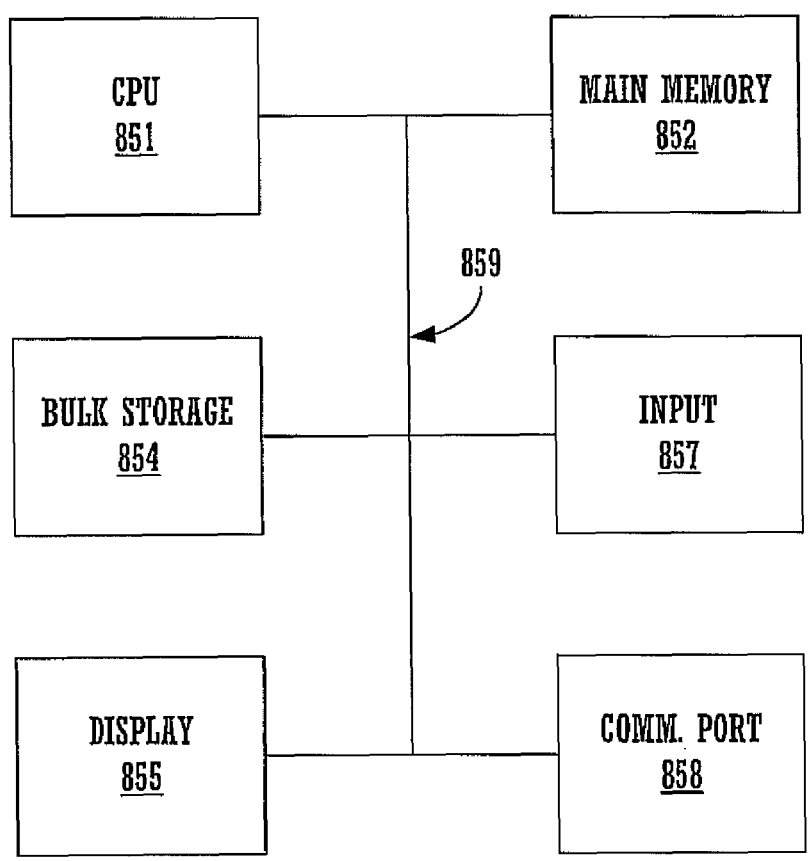
FIG. 8 is a block diagram of code translation system 800 in accordance with one embodiment of the present invention.

FIG. 8 is a block diagram of code translation system 800 in accordance with one embodiment of the present invention. In one exemplary implementation, system 800 is utilized to implement methods and processes of the present invention. In general, system 800 comprises a bus 859, a central processor 851, a main memory 852, a bulk storage device 854, a display device 855, an input device 857, and a communication port 858. Bus 859 is coupled to central processor 851, main memory 852, bulk storage device 854, display device 855, input device 857, and communication port 858.

The components of system 800 cooperatively operate to perform their designated functions. Central processor 851 processes information and instructions including instructions associated with methods of the present invention (e.g., 100, 200, 300, 400, 600 and 700). Main memory 852 stores information and instructions for the central processor 851 including information and instructions associated with methods of the present invention. Bulk storage device 854 (e.g., a magnetic or optical disk and disk drive, a compact disk drive, etc.) provides bulk storage for storing information and instructions. Display device 855 displays information to a computer user. Input device 857 can include alphanumeric and function keys and a cursor control device (e.g., a mouse) for communicating information and command selections to the central processor 851. Communications port 858 communicates information to and from a network. Bus 859 is a path for communicating information between components of system 800. It is appreciated that system 800 is one exemplary implementation of a present invention code translation verification system and embodiments of the present invention can be implemented in a variety of system configurations.

Thus, the present invention facilitates software code translation and/or optimization operations. The present invention permits otherwise intractable large programs translations to be verified. In one embodiment, the present invention allows a large percentage of possible input data set to be considered both when the set of source and target code programs under consideration are fixed and/or themselves are dynamically generated as part of a larger translation scheme. The present invention can facilitate the translation verification of arbitrary programs that are otherwise mathematically unsolvable and intractable data sets. For example, the steps in the verification algorithm are applied to decomposed fragments in a manner that permits handling of larger non-trivial class of programs to be checked for equivalence.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A code verification method comprising:
   performing a decomposition process wherein a resulting plurality of code fragments are bounded by externally observable points and by an execution time restriction between the externally observable points wherein the externally observable points comprise points at which internal program states become externally visible, wherein the internal program states are matched at a pair of corresponding ones of the points; and
   performing a validation process on the code fragments.

2. The method of claim 1, wherein correspondence between resulting code fragments of a source code and resulting code fragments of a target code are identified.

3. The method of claim 1, wherein results of executing one of the plurality of code fragments includes assumptions for use in another subsequent one of the plurality of code fragments.

4. The method of claim 1, wherein the validation process includes:
   gathering assumptions for one of the plurality of code fragments;
   generalizing inductive state components for each loop back edge;
   executing symbolically the one of the plurality of code fragments; and
   extracting a proof obligation from results of the executing symbolically.

5. The method of claim 1, wherein the validation process includes establishing a proof status by invoking a suitable prover for comparing a pair of the plurality of code fragments.

6. The method of claim 5, wherein the pair of the plurality of code fragments includes a corresponding source code fragment and a target code fragment.

7. The method of claim 1, wherein a proof obligation is extracted from observable exit points for relevant state components and coupling invariants identified for induction.

8. The method of claim 1, wherein assumptions are passed on to subsequently ordered code fragments.

9. A decomposition process comprising:
   performing a fragment determination process in which code fragments are bounded in accordance with ordered externally observable points and in accordance with an execution time between the ordered externally observable points wherein the externally observable points comprise points at which internal program states become externally visible, wherein the internal program states are matched at a pair of corresponding ones of the points; and
   establishing a correspondence between the resulting bounded code fragments wherein the fragment determination process comprises:
   receiving a piece of code;
   identifying observation points in the piece of code;
   breaking the piece of code down into basic code blocks delineated in an initial order;
   associating the basic code blocks with code fragments; and
   defining a partial order for the code fragments.

10. The decomposition process of claim 9, wherein a fragment includes a first code block with an externally observable point and a second code block that does not include an observation point, wherein the second code block is reachable from the first code block without going through a third code block that includes another observation point.

11. The decomposition process of claim 10, wherein an indication of the correspondence is included in information from a translator.

12. The decomposition process of claim 11, wherein backtracking is utilized to establish complete correspondence.

13. The decomposition process of claim 9, further comprising cleanup of the correspondence between the resulting bounded code fragments, including utilizing null set correspondence blocks.

14. The decomposition process of claim 9, further comprising establishing consistency in the correspondence.

15. A code translation method comprising:
   receiving a source code;
   translating the source code into a target code; and
   performing a tractable decomposition verification process on the results of the translating wherein the tractable decomposition verification process comprises:
   decomposing the source code and the target code into code fragments wherein the code fragments are bounded by externally observable points and execution time restrictions between the externally observable points wherein the externally observable points comprise points at which internal program states become externally visible, wherein the internal program states are matched at a pair of corresponding ones of the points; and
   performing a validation process on the code fragments.

16. The code translation method of claim 15, wherein the decomposition verification process comprises:
   identifying observation points in the source code fragments and the target code fragments;
   establishing a plurality of code blocks delineated in an initial order the code blocks are associated with the source code fragments and the target code fragments;
   defining a partial order between the source code fragments and target code fragments by removing back edges of loops in a manner that produces a loop free code segments; and
   establishing a correspondence between the source code fragments and the target code fragments.

17. The code translation method of claim 15, wherein the validation process includes:
  gathering assumptions for one of the plurality of code fragments;
  generalizing inductive state components for each loop back edge;
  executing symbolically the one of the plurality of code fragments; and
  extracting a proof obligation from results of the executing symbolically; and
  passing assumptions on.

18. A system comprising:
  a means for storing instructions associated with code translation;
  a means for performing the instructions, including instructions associated with:
    performing a decomposition process wherein a resulting plurality of code fragments are bounded by externally observable points and by an execution time restriction between the externally observable points wherein the externally observable points comprise points at which internal program states become externally visible, wherein the internal program states are matched at a pair of corresponding ones of the points; and
    performing a validation process on the code fragments.

19. The system of claim 18 wherein correspondence between resulting code fragments of a source code and resulting code fragments of a target code are identified.

20. The system of claim 18 wherein the validation process checks if a target code fragment produces same results as a source code fragment.

21. An article of manufacture including a computer-readable medium having instructions stored thereon the instructions comprising:
  instructions to perform a fragment determination process in which code fragments are bounded in accordance with externally observable points and in accordance with an execution time between ordered externally observable points wherein the externally observable points comprise points at which internal program states become externally visible, wherein the internal program states are matched at a pair of corresponding ones of the points; and
  instructions to establish a correspondence between said resulting bounded code fragments.

22. The article of manufacture of claim 21 wherein observation point in a first fragment is matched with an observation point in a second fragment.

23. The article of manufacture of claim 21 wherein said instructions further comprise instructions to perform a validation process on the code fragments.

24. A system comprising:
  a processor configured to:
    translate source code into a target code; and
    decompose the source code and the target code into code fragments wherein the code fragments are bounded by externally observable points and execution time restrictions between the externally observable points wherein the externally observable points comprise points at which internal program states become externally visible, wherein the internal program states are matched at a pair of corresponding ones of the points; and
    perform a validation process on the code fragments; and
  a memory for storing information associated with the processing.

25. The system of claim 24 wherein the translating is part of code morphing operations.

26. The system of claim 24 wherein the validation process determines if a target code fragment produces same results as a source code fragment.

* * * * *